(12) United States Patent
Mank (10) Patent No.: US 8,819,746 B2
(45) Date of Patent: Aug. 26, 2014

(54) NETWORK DEVICE FOR A HOME ENTERTAINMENT NETWORK

(75) Inventor: Armin Mank, Waiblingen (DE)

(73) Assignee: Sony Europe Limited, Weybridge (GB)

( * ) Notice: Subject to any disclaimer, the term of this patent is extended or adjusted under 35 U.S.C. 154(b) by 10 days.

(21) Appl. No.: 13/635,525

(22) PCT Filed: Mar. 29, 2011

(86) PCT No.: PCT/EP2011/054816
§ 371 (c)(1),
(2), (4) Date: Sep. 17, 2012

(87) PCT Pub. No.: WO2011/120963
PCT Pub. Date: Oct. 6, 2011

(65) Prior Publication Data
US 2013/0014184 A1    Jan. 10, 2013

(30) Foreign Application Priority Data

Mar. 29, 2010   (EP) .................................. 10158197

(51) Int. Cl.
*H04N 7/18* (2006.01)
*H04N 7/173* (2011.01)
*G06F 15/177* (2006.01)
*G06F 15/16* (2006.01)

(52) U.S. Cl.
USPC ............. 725/80; 725/118; 725/119; 725/148; 725/149; 709/220; 709/230; 709/249

(58) Field of Classification Search
CPC .................... H04N 21/43635; H04N 21/4667; H04N 7/173; H04L 45/04
USPC ............. 725/80, 85, 118, 121, 141, 153, 119, 725/148, 149; 709/220, 223, 230, 238, 245, 709/249
See application file for complete search history.

(56) References Cited

U.S. PATENT DOCUMENTS 6,523,696 B1   2/2003   Saito et al.
8,032,911 B2 *  10/2011  Ohkita ............................ 725/74

(Continued)

FOREIGN PATENT DOCUMENTS

EP   1 926 254    5/2008
WO   00 59230   10/2000

OTHER PUBLICATIONS

International Search Report Issued May 20, 2011 in PCT/EP11/54816 Filed Mar. 29, 2011.

*Primary Examiner* — Hai V Tran
(74) *Attorney, Agent, or Firm* — Oblon, Spivak, McClelland, Maier & Neustadt, L.L.P.

(57) ABSTRACT

A network device for a network including a network controller adapted to provide Ethernet communication capability and CEC (consumer electronics control) communication capability, and a database generator unit adapted to generate a device database containing information about the network devices being member of the home entertainment network and/or an operation history database containing information about network device operations tasked by a user of a network device of the network. A method for controlling and re-routing audio, video and data streams in a network, includes: generating a device database containing information about the network devices being member of the network and/or an operation history database containing information about network device operations tasked by a user of a network device.

32 Claims, 3 Drawing Sheets

(56) References Cited

U.S. PATENT DOCUMENTS

| | | | |
|---|---|---|---|
| 8,307,401 B1* | 11/2012 | Lida | 725/80 |
| 2006/0053219 A1* | 3/2006 | Kutsumi et al. | 709/224 |
| 2008/0094245 A1 | 4/2008 | Hardacker et al. | |
| 2008/0126591 A1 | 5/2008 | Kwon | |
| 2009/0147782 A1* | 6/2009 | Mank | 370/389 |
| 2010/0127886 A1 | 5/2010 | Hardacker et al. | |

* cited by examiner

FIG. 1

Example Database 1:

| Date & Time | Logical Address | Physical Address | Network ID |
|---|---|---|---|
| 1.2.2010 17:00 | 0 (TV) | 0.0.0.0 | A |
| 1.2.2010 17:00 | 4 (Playback Device 1) | 1.0.0.0 | A |
| 1.2.2010 17:00 | 8 (Playback Device 2) | 2.0.0.0 | A |
| 1.2.2010 20:00 | 0 (TV) | 0.0.0.0 | B |
| 1.2.2010 20:00 | 4 (Playback Device 1) | 1.0.0.0 | B |
| 1.2.2010 20:00 | 0 (TV) | 0.0.0.0 | C |
| 10.2.2010 17:00 | 4 (Playback Device 1) | 1.0.0.0 | C |
| 10.2.2010 17:00 | 8 (Playback Device 2) | 2.0.0.0 | C |
| 15.2.2010 17:00 | 0 (TV) | 0.0.0.0 | D |
| 15.2.2010 17:00 | 4 (Playback Device 1) | 1.0.0.0 | D |
| 15.2.2010 17:00 | 8 (Playback Device 2) | 2.0.0.0 | D |

Fig. 2

Example Database 2:

| Date & Time | Source | Sink | Operation | Mode | Time stamp | UserID |
|---|---|---|---|---|---|---|
| 22.2.2010; 20:30 – 21:45 | LA:8; PA:2.0.0.0; NwID:A | LA:0; PA:0.0.0.0; NwID:A | Playback | TMDS | 0:00:00 | User1 |
| | | | | | | |

Fig. 3a

Example Database 2:

| Date & Time | Source | Sink | Operation | Mode | Time stamp | UserID |
|---|---|---|---|---|---|---|
| 22.2.2010; 20:30 – 21:45 | LA:8; PA:2.0.0.0; NwID:A | LA:0; PA:0.0.0.0; NwID:A | Playback | TMDS | 0:00:00 | User1 |
| 22.2.2010; 21:43 | LA:8; PA:2.0.0.0;NwID:A | | Stop PB | | 0:75:05 | User1 |
| 22.2.2010; 21:45 | | LA:0; PA:0.0.0.0; NwID:A | System Standby | | | User1 |

Fig. 3b

Database 2:

| Date & Time | Source | Sink | Operation | Mode | Time stamp | UserID |
|---|---|---|---|---|---|---|
| 22.2.2010; 20:30 – 21:45 | LA:8; PA:2.0.0.0; NwID:A | LA:0; PA:0.0.0.0; NwID:A | Playback | TMDS | 0:00:00 | User1 |
| 22.2.2010; 21:43 | LA:8; PA:2.0.0.0; NwID:A | | Stop PB | | 0:75:05 | User1 |
| 22.2.2010; 21:45 | | LA:0; PA:0.0.0.0; NwID:A | System Standby | | | User1 |
| 22.22010; 22:30 | LA:8PA:2.0.0.0; NwID:A | LA:0;PA:0.0.0.0; NwID:B | Playback | HEC | 0:75:05 | User1 |

NETWORK DEVICE FOR A HOME ENTERTAINMENT NETWORK

CROSS-REFERENCES TO RELATED APPLICATIONS

The present application claims the benefit of the earlier filing date of 10 158 197.3 filed in the European Patent Office on Mar. 29, 2010, the entire content of which application is incorporated herein by reference.

FIELD OF INVENTION

The present invention relates to a network device for a network, particularly for a home entertainment network. The invention also relates to a network, particularly a home entertainment network, comprising such a network device, a data table stored in a memory of such a network device and a method for controlling and rerouting audio/video and data streams in a network.

BACKGROUND OF THE INVENTION

Home entertainment devices, like TV sets, set-top boxes, DVD or Blu-ray disc players, MP3 players, etc., get more and more popular, particular if equipped with a so-called HDMI interface. HDMI is the abbreviation of High Definition Multimedia Interface and is a compact audio/video interface for transmitting uncompressed digital data. HDMI allows to connect digital audio/video sources, such as set top boxes, DVD players, Blu-ray disc players, Personal Computers, videogame consoles and AV receivers to compatible digital audio devices, computer monitors and digital televisions. HDMI supports on a single cable any TV or PC video format, including standard, enhanced and High Definition Video, up to eight channels of digital audio and a Consumer Electronics Control (CEC) connection. The CEC allows HDMI devices to control each other when necessary and allows the user to operate multiple devices with one remote control hand set.

In the most recent HDMI version 1.4, which was released on May 28, 2009, an HDMI Ethernet channel has been specified which allows for a 100 MB/s Ethernet connection between two HDMI connected devices. This Ethernet capability allows to connect HDMI networks which comprises for example a TV set and a video player, with other HDMI networks. In other words, it is possible to build up a multiroom home entertainment network comprising several HDMI networks distributed through the home of a user.

There is an increasing demand for further capabilities of such home entertainment networks, particularly to give a user more options for selecting devices within the network.

SUMMARY OF INVENTION

It is therefore an object of the present invention to provide network devices which have enhanced network related capabilities.

According to an aspect of the present invention there is provided a network device for a network, comprising a network controller adapted to provide Ethernet communication capability and CEC, consumer electronics control, communication capability, and a database generator unit adapted to generate a device database containing information about the network devices being member of the network and/or an operation history database containing information about network device operations tasked by a user of a network device of the network.

That is in other words that the network device is technically equipped with a unit which has the capability to generate either a device database or an operation history database or both. These databases contain relevant data about the devices within the network, which is preferably a home entertainment network, and the operations carried out by the users, respectively. Either database offers the network device designer a plurality of options to increase the functional range of the network device. In particular, the databases generated by the database generator unit are the technical prerequisite for solutions to control and direct for example audio/video and data streaming within a network, particularly a multiroom HDMI network. Playback and recording of streams can be realized independent from the location of the network devices.

In a preferred embodiment, the network device comprises a detecting unit adapted to detect each device operation tasked by a user of the network device, a generator unit adapted to generate a data record on the basis of the detected device operation, and a storage unit adapted to store the data record in the operation history database.

That is in other words that the network device has the capability to register an operation carried out by the user, like play video, stop video, etc. The detected operation is then the basis for a data record which is stored in the operation history database. The data record may further comprise at least a network address of the network device, an indication of the operation detected and the date and time the operation was detected. The data record may also comprise a timestamp information and a user identification (ID).

Hence, the operation history database gives a detailed picture of the operations selected by the user in the past.

Preferably, the data record is further enriched with the network address of network devices within the network being involved in the operation. That is in other words that the data record comprises the network address of the source device, for example a Blu-ray disc player, as well as the network address of the sink device, for example a TV set.

In a preferred embodiment, the network address comprises an address according to the HDMI specification and a sub-network identifier identifying the sub-network, which the network device is part of, within the home entertainment network.

The HDMI specification (version 1.4) specifies a limited addressing scheme which allows only one sink (e.g. a TV set) within a network. Hence, in a multiroom network, multiple HDMI networks (hereinafter also called sub-networks) are built up, each using its own addressing scheme. The result is that the network devices do not have unique addresses within the whole network. To overcome this deficiency, the assignee of the present application has proposed to extend the addressing scheme and to implement unique identifiers for each HDMI sub-network within network. The address according to the HDMI specification together with the sub-network identifier provides a unique address for each network device and allows the communication beyond the HDMI sub-network boundaries. A detailed description of the sub-network identifiers is given in the patent application EP 09156939.2 filed by the assignee of the present application on Mar. 31, 2009, the content of which is incorporated by reference herewith.

According to a preferred embodiment, the network device comprises an evaluation unit adapted to evaluate the operation history database and/or the device database, and an operation option unit adapted to provide operation options in response to the evaluation of the database.

That is in other words that the network device has the capability to offer the user an operation or control option based on the information stored in the operation history database and/or the device database. For example, the operation history database may comprise a data record indicating that the playback of a movie from a Blu-ray disc player to a TV set has been stopped. On another network device within the network, the user may be offered the option to resume the playback from the Blu-ray disc player, however, to a different TV set.

It is to be noted that this is just one of a plurality of conceivable operation options which may be implemented in a network device.

In a preferred embodiment, the data record further comprises information about the user tasking the operation. Preferably, the network device comprises a user identification unit adapted to identify the user. More preferably, the user identification unit comprises a camera unit and a face recognition unit.

In other words, the network device is able to enrich the data record with a user identification, which is preferably generated automatically, for example by use of a face recognition unit.

This measure has the advantage that the operation option unit which provides operation options may filter the operation options and tailor the operation options on the user.

In a preferred embodiment, the network device comprises a synchronization unit adapted to synchronize the operation history database and/or the device database with respective databases of other network devices of the network. Preferably, the synchronization unit uses the Ethernet or CEC communication capability for synchronizing.

This measure has the advantage that first the load of the database generator unit can be reduced because of using information other network devices have already generated before. Second, synchronizing the databases ensures that all network devices use the same information.

In a further preferred embodiment, the device database comprises a data record for every network device being a member of the home entertainment network. Preferably, the data record comprises an HDMI address, a sub-network identifier and date/time information the respective network device has logged in.

The network device may be any device equipped with an HDMI interface (at least version 1.4). Such network devices are for example TV sets, set-top boxes, Blu-ray disc devices, DVD disc playback devices, AV receivers, video recorder devices, MP3 player devices, Personal Computer devices, mobile devices, like a personal digital assistant, Smartphone devices, etc. However, it is to be noted that this list of network devices is not exhaustive. Other devices having an HDMI interface also fall within the scope of the present invention.

In a preferred embodiment, the network device comprises a remote control adapted to send a unique identifier identifying the remote control within the network.

That is in other words that the remote control sends not only an operation command but also an identifier which is unique for the remote control. This identifier can then be stored in one of the databases, preferably the operation history database, and can be used by the operation option unit.

According to another aspect of the present invention there is provided a network which comprises at least two network devices according to the present invention.

Preferably, at least one of the network devices is member of a first sub-network of the network and at least a second of the network devices is member of a second sub-network of the same network, wherein the sub-networks are communicationally coupled by a switch device.

That is in other words that the network is built up of at least two sub-networks, preferably HDMI sub-networks. Each of these sub-networks comprises for example one sink device and at least one source device.

The sub-networks are coupled via a switch device including for example router devices having switch capabilities. Preferably each sub-network comprises one network acting as a proxy and coupled with the switch device. The other network devices of the same sub-network then have not to be coupled directly with the switch device.

The connection of the sub-networks with each other via the switch device allows to stream data (comprising for example audio/video data) from one sub-network to another sub-network. However, a prerequisite for this streaming from one sub-network to another sub-network is the extended addressing of HDMI devices which has already been described above.

According to another aspect of the present invention there is provided a data table stored in a memory of a network device according to the present invention, comprising first information indicating an operation of a particular network device, second information indicating the network address of said particular network device and third information indicating the time and date of the operation. Preferably, the data table comprises fourth information indicating a network address of a further network device involved in the operation.

This data table is used for the operation history database as explained above.

According to a further aspect of the present invention, a method for controlling and rerouting audio, video and data streams in a network is provided. The method comprises the steps of generating a device database containing information about the network devices being member of the network and/or an operation history database containing information about network device operations tasked by a user of a network device.

The advantages of this method are the same as those of the network device mentioned above so that it is referred thereto.

In a preferred embodiment, the method comprises the step of rerouting the audio, video or data stream from one network device to another network device on the basis of the data stored in the operation history database and/or the device database. Preferably, the method comprises the step of presenting the user a list of network devices for selection as a source or sink network device for streaming, the list being generated on the basis of the operation history database and/or the device database.

Further preferred embodiments of the invention are defined in the dependent claims. It shall be understood that the claimed method has similar and/or identical preferred embodiments as the claimed network device and as defined in the dependent claims.

The present invention is based on the idea that at least one of a device database and an operation history database is generated by a database generator unit in a network device. Either database allows to increase the functional range of the network device in a great extent. In particular, the databases form the basis for seamlessly streaming audio/video and data from one sub-network, preferably a HDMI network, to another sub-network, preferably a HDMI network, of a network, preferably a home entertainment network. Hence streaming from one room to another room is possible and is readily selectable by the user because the network device may be designed to offer respective selectable options on the basis of the database content.

It is to be understood that the features mentioned above and those yet to be explained below can be used not only in the respective combinations indicated, but also in other combinations or in isolation, without leaving the scope of the present invention.

BRIEF DESCRIPTION OF DRAWINGS

These and other aspects of the present invention will be apparent from and explained in more detail below with reference to the embodiments described hereinafter. In the following drawings

DESCRIPTION OF PREFERRED EMBODIMENTS

Figure 1:
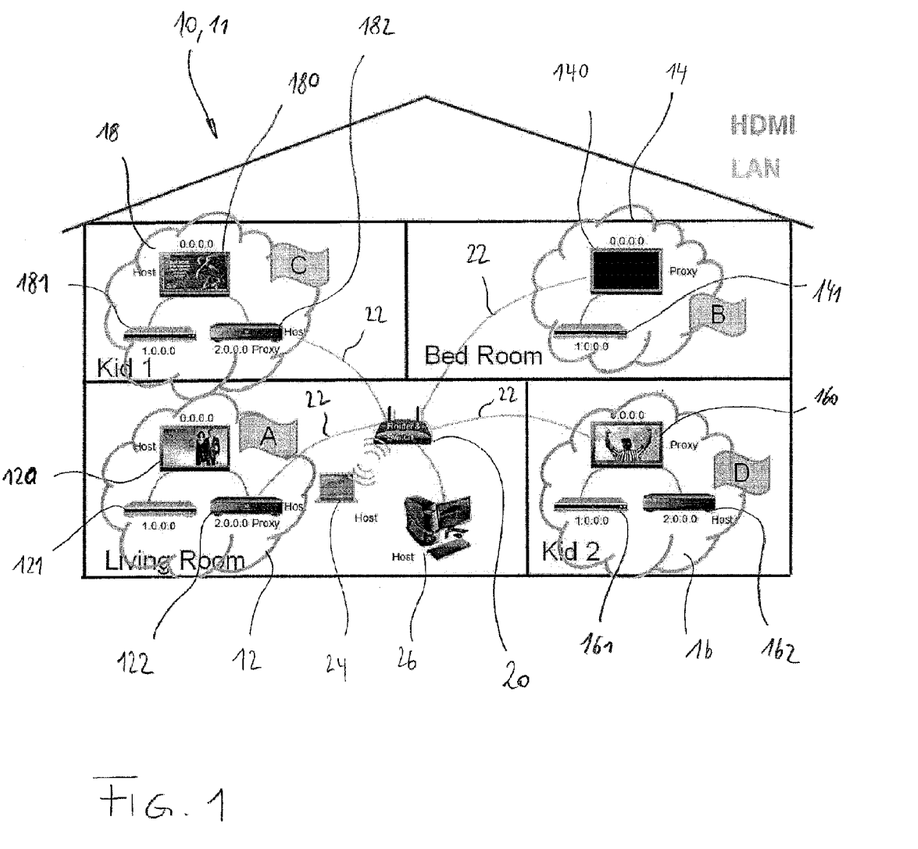
FIG. 1 shows an example of a home entertainment network.

In FIG. 1, an illustrative example of a home entertainment network is shown and designated with reference numeral 10. This illustrative example serves to describe the network devices and their functionality. However, it is to be noted that the present invention is not limited to such a home entertainment network.

In the context of the present invention, home entertainment network means any data network designed to couple network devices which in turn are designed to store, manage and access all forms of digital media in the home. One example of such a home entertainment network is a HDMI network, the network devices of which having HDMI interfaces for providing the network capability. HDMI is a standard for transmitting uncompressed digital data and is the abbreviation of High Definition Multimedia Interface. In the following, it is assumed that the home entertainment network 10, shown in FIG. 1, is a HDMI network 11 comprising several HDMI sub-networks. However, the present invention is not limited to HDMI networks.

The HDMI network 11, shown in FIG. 1, extends over several rooms, in the present embodiment four rooms, within a home. The HDMI network 11 comprises four sub-networks 12, 14, 16, 18, one for each room.

Each sub-network 12, 14, 16, 18 comprises at least one network device, preferably at least two network devices, one of which acting as a sink device and the other as a source device. A sink device receives audio/video streams and displays or plays back the video and audio streams, respectively. The source device in turn generates the audio/video streams from a Blu-ray disc, for example, and transmits this stream to the sink device.

According to the HDMI specification (version 1.4) a HDMI sub-network is allowed to comprise one sink device only and a plurality of source devices. Although this restricted sub-network structure is used in the present embodiment, the present invention is not limited thereto, that is the sub-network may also comprise several sink devices and source devices in the event that the HDMI specification will eliminate this restriction.

In the example shown in FIG. 1, the four sub-networks 12-18 comprise a sink device in form of a TV set 120, 140, 160, 180 and at least one source device in form of a Blu-ray disc player 122, 162, 182 and/or a set-top box 141. The sub-networks 120, 160 and 180 comprise further source devices, for example set-top boxes 121, 161, 181.

All the sink and source devices which are also referred to as network devices, are equipped with HDMI interfaces for coupling the source devices with the sink device in a sub-network.

The HDMI network 11 also comprises a network switch 20 which is preferably be equipped with a router functionality. The switch 20 allows the communication of the sub-networks beyond their boundaries, so that a communication path between different sub-networks may be established.

As it is shown in FIG. 1, data lines 22 are provided between the switch 20 and one network device within a sub-network 12-18. For example, the Blu-ray disc device 122 in the sub-network 12 is connected with the switch 20 via the data line 22. The network devices which are coupled to the switch 20 are referenced as proxy in FIG. 1.

The data lines 22 are preferably Ethernet data lines carrying data according to the TCP/IP protocol. However, it is of course possible to use other communications protocols allowing the streaming of audio/video content.

Further, it may also be contemplated to realize the data communications between a sub-network and the switch wirelessly, for example by using the known Wireless Local Area Network (WLAN) standards.

Just for completeness, the network 10 may also comprise a notebook 24 which wirelessly communicates with the switch 20 and a Personal Computer 26 which is coupled with the switch 20 via an Ethernet line.

It is apparent that a communication between sub-networks via the switch 20 requires unique addresses assigned to the respective network devices. Although the HDMI specification defines an address scheme, this scheme does not allow such a communication due to the ambiguities of the addresses. It is for example known from the HDMI specification that the sink device of a HDMI sub-network 12, 14, 16, 18 is always assigned the address 0.0.0.0, as it is shown in FIG. 1. The source devices which are coupled with the sink device are assigned the addresses 1.0.0.0 or 2.0.0.0, as it is the case in the sub-networks 12, 16 and 18.

It is readily apparent that the sink devices 120, 140, 160, 180 of the home entertainment network 10 has the same HDMI address which makes a communication between these devices impossible.

To solve this address problem, an extended address scheme is used. The basis of this extended address scheme is a sub-network identifier which is unique for each sub-network. For example, sub-network 12 is assigned the identifier "A", the sub-network 14 is assigned the identifier "B", and so on. Hence a combination of the HDMI address, like 0.0.0.0, and the sub-network identifier, like "A", unambiguously identifies one network device within the whole home entertainment network 10. This extended network scheme is the subject of a patent application EP 09156939, filed on Mar. 31, 2009, the content of which is incorporated by reference herewith.

Hence, the network structure shown in FIG. 1 allows for example the data transmission (e.g. video streaming) between a source device 122 of one sub-network 12 and a sink device 140 of another sub-network 14 using Ethernet.

As to make this capability of the home entertainment network 10 readily achievable for a user, the network devices use at least one, preferably two databases, namely a device database and an operation history database.

Figure 2:
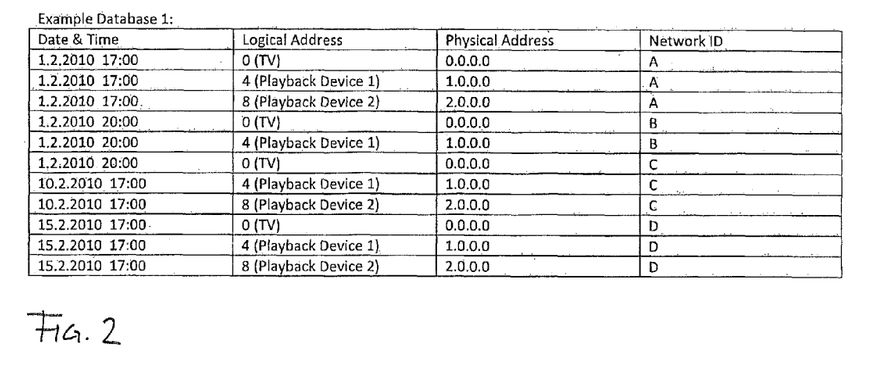
FIG. 2 shows an example of a device database.

The first database contains information about all network devices which have been recognized in the home entertainment network 10 in the past. An example of such a device database (database 1) is shown in FIG. 2. The device database in the present example comprises eleven data records, one for each network device in the home entertainment network 10.

Each data record comprises the date and time, the network device has logged in, a logical address, a physical address and the network identifier. The logical address and the physical address are part of the HDMI specification. For example, the TV set 120 of the sub-network 12 is described by the first data record of the device database. The TV set 120 has been logged in or switched on the first time on Feb. 1, 2010, at 5 o'clock pm. The physical address of the TV set 120 is 0.0.0.0, the logical address is 0, and the sub-network, the TV set is member of, is assigned the network identifier "A".

On the basis of this device database, it is possible to find a particular network device within the home entertainment network and to send data to this device.

There are many possibilities to build up such a device database. A preferred way is to send data packages to each possible address within the home entertainment network 10. If a network device receives a respective data package, it returns an acknowledge message back to the sender. This acknowledge message is received and causes the generation of a data record as mentioned above. Generally, the network devices are able to return an acknowledge message even if they are in a standby mode. Only if the respective network device is switched off, it is not recognized and hence will not result in generation of a data record.

The device database is preferably stored in every network device, but it is also possible to store this database only in the proxy of each sub-network. Further, to enhance the generation of the device database, it is also possible to synchronize the device databases of different network devices of the same or different sub-networks. Synchronizing means in the context of the present application that the data records of other device databases are collected and added to the own device database if this information is not already present.

It is also to be noted that data records corresponding to particular network devices are not deleted if the respective network device is for example switched off. The second database, which is the operation history database, contains data records describing the operations carried out in the whole home entertainment network 10 in the past. In other words, the operation history database is a picture of the operations tasked by any user. The operation history database may be compared with a log book in which events are recorded.

Figure 3A:
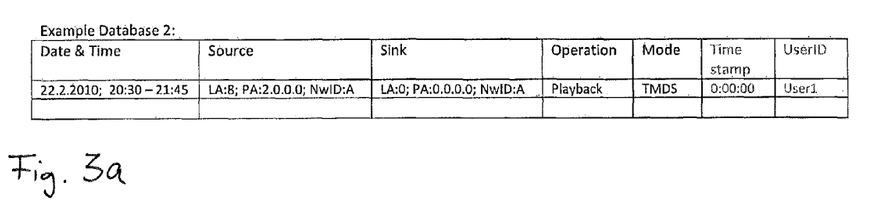
FIGS. 3a and 3b and 3c show examples of operation history databases.
Figure 3B:
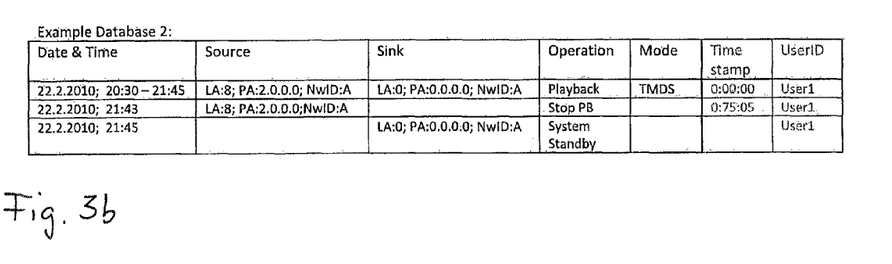
Figure 3C:
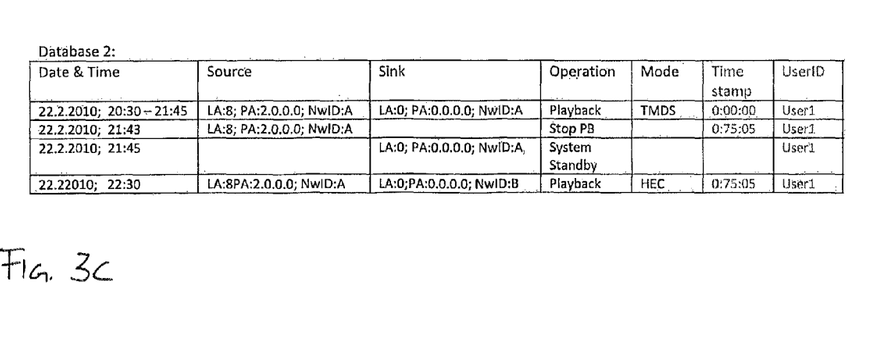

Examples of an operation history database are shown in FIGS. 3a to 3c. It is apparent therefrom that a data record of the operation history database (database 2) comprises date and time, the address of the source device, the address of the sink device, the kind of operation tasked by the user, the mode of the data transmission, a time stamp containing information at which point e.g. a playback was paused or stopped and a user ID defining which user tasked the respective operation. The data record in the operation history database of FIG. 3a contains the information that there was a playback operation between the source device with the address 2.0.0.0 of sub-network A (Blu-ray disc device 122) to the sink device with the address 0.0.0.0 of the same sub-network A (TV set 120). For transmitting the data from the source to the sink the transition-minimized differential signaling (TMDS) has been used. The respective operation has taken place on Feb. 22, 2010 from 8:30 pm to 9:45 pm. The time stamp is set to 0:00:00 and the user having tasked this operation is User1.

The operation history database is preferably stored in each network device of the home entertainment network 10, or as an alternative in at least the proxy of each sub-network.

The operation history database is automatically generated and a data record is added each time the user carries out an operation, like playback, stop playback, switch on, switch into standby mode, etc. Hence, the operation history database grows with time, as it is shown in FIGS. 3b and 3c. For example, in FIG. 3b, two further data records have been added to the operation history database. The first added data record contains the information that the source device 122 of sub-network 12 has been operated by the user, namely User1, to stop playback at 9:43 pm and at time position 0:75:05 of the playback medium. The second added data record contains the information that the sink device, namely the TV set 120 of the sub-network 12 has been switched off into the standby mode by the user, namely User1.

At 10:30 pm, the user, namely User1, has started playback from the source device 122 to the sink device 140 of the sub-network 14 (network identifier B) at time position 0:75:05 of the playback medium. For streaming the respective data from the source device to the sink device, the Ethernet communication capability is used. The respective data record is shown in the database of FIG. 3c in the last line.

In order to limit the growth of the operation history databases, it is possible to delete or overwrite data records according to selectable rules, e.g. data records older than a selectable time period are deleted.

Each network device of the home entertainment network 10 is adapted to detect any operation tasked by a user and to generate a respective data record to be added to the operation history database. In the event that the network device may only detect its own operations, the operation history databases are synchronized between the network devices of the home entertainment network. As a result, the operation history databases all comprise the same information and also information corresponding to operations of other network devices within the home entertainment network 10.

The synchronization of the databases within the home entertainment network 10 may be carried out by using the Ethernet capability, the HEC capability or any other communications standard, like the consumer electronics control of the HDMI specification. Ethernet is e.g. used between proxies of different sub-networks, and HEC is e.g. used between devices within a sub-network. A combination of both is also possible.

As already mentioned before, the databases, namely the device database and the operation history database, are synchronized. The synchronization might be triggered for example every time an operation is executed, every time a network device is powered up, or for example manually by the user via a graphical user interface or for example a remote control command or any other selectable rule.

With respect to the database synchronization, it would also be possible to hold a "master" database (i.e. a "master" device database and/or a "master" operation history database) centrally, e.g. in the router device, thus having the advantage that all devices may read out the database once when they are powered on and from that time either in a regular time slice or when they are involved in a user operation, If a central "master" database present, always in case of a user operation, the operation has to be registered in this "master" database.

The generation and maintenance of the described databases serve at least one major purpose, namely to give the user more options to control the operation of the network devices of the home entertainment network. Some examples are presented below. However, it is to be noted that the list of examples is not exhaustive and of course further examples are conceivable on the basis of either of the two databases.

In general, with the device database, all network devices have the overview about the devices in the network: source devices, sink devices and for example repeater devices, also mobile devices that are not permanent present may be contained in the device database. Based on this device database, it is possible to provide the user with device selection possibilities that are available in the home entertainment network.

For example, if the user switches on the TV set 120, a menu is presented which lists all source devices for selection registered in the device database. This gives the user the possibility to select for example the Blu-ray disc player 182 of the sub-network 18.

With the operation history database all network devices have the knowledge about the operations in the network, for example the device status, streaming directions, active source, sink and repeater devices. Also playback and power operations are shared. The operation history database offers at any time and on any network device the current status of operations. It offers also the possibility to transfer operations among network devices, for example a video streaming from a source device to a sink device could be transferred to another sink device seamlessly. A more detailed explanation of such a possibility will follow below.

Generally, the options of such operations can be controlled and presented in various ways to the user, for example by displaying the options via a graphical user interface, by selection of options with dedicated commands, by face recognition technologies or by special remote commander devices with identification tags IDs.

An illustrative scenario in which both databases are used for offering control options, is for example as follows:

A user starts to playback a video from the Blu-ray disc player 122 of the sub-network 12 via for example a "one touch play" feature. The Blu-ray disc player 122 as a source device is then streaming the video content to the coupled TV set 120, which acts as the sink device, of the sub-network 12. The source device 122 registers the respective control command from the user and generates a data record for the operation history database. This record is for example shown in FIG. 3*a*.

After a while, the user wants to move from the living room to the bedroom and wants to continue watching the video in the bedroom. He therefore stops the playback and hence the streaming to the sink device 120 and powers off the sink device in the living room, for example via a "system standby" feature (which is specified in the HDMI specification supplement 1 CEC). Again, a particular data record is generated and added to the operation history database, as shown in FIG. 3*b*. Here, two data records have been added, one relating to the source device 122 and one to the sink device 120.

Then the user goes to the bedroom and powers on the TV set 140 of the sub-network 14. If the synchronization of the operation history database between the proxy (Blu-ray disc device 122) of the sub-network 12 and the respective proxy, here the TV set 140, was already done (if for example a scheduled synchronization happened before) the graphical user interface (GUI) of the TV set 140 of the sub-network 14 will immediately offer the option to continue the playback that was stopped at time position 0:75:05 in the living room. The respective information for presenting this option is gained from the operation history database. The second data record of the database shown in FIG. 3*b* gives the information that the Blu-ray disc device 122 of the sub-network 12 has been stopped shortly before.

In the event that the operation history database has not been synchronized when the user powers on the TV set 140, the graphical user interface may offer to manually synchronize the database.

The way the graphical user interface of the TV set 140 offers the option for a play-back from the living room could vary:

The name of the video that was played back in the living room could be shown;
a graphical interpretation of the whole home network that highlights the living room Blu-ray disc player 122 could be shown, or
any other way of presentation could be considered.

In the next step, the user selects the offered continuation of the playback at time position 0:75:05 from the Blu-ray disc device 122 of the living room. The TV set 140 of the bedroom knows from the operation history database the network ID, the logical and the physical address of the Blu-ray disc device 122 in the living room and the time stamp. The TV set 140 in the bedroom now activates an Ethernet channel to the living room Blu-ray disc device 122.

Once the Ethernet channel from the TV set 140 of the bedroom to the Blu-ray disc device 122 of the living room is activated, the streaming of audio and video can be started from an application, for example DLNA (Digital Living Network Alliance). Any other conceivable application can start the streaming from the Blu-ray disc device 122 in the living room to the TV set 140 in the bedroom via an Ethernet Channel.

As a result of this rerouting of the audio and video stream, a respective data record is generated by the two involved network devices 122, 140 and is added to the operation history data base, as shown in FIG. 3*c*.

It is to be noted that this is just an illustrative example how to use the mentioned databases. This example could for example be improved by using any user recognition process for identifying the user who has operated the network devices. If for example the TV set 140 in the bedroom recognizes that the same user has switched on the TV set 140 who has stopped the playback in the living room before, the TV set 140 could use this information for automatically rerouting the audio and video stream from the living room to the bedroom without waiting for a user selection.

Several user recognition processes are conceivable, for example a face recognition or special remote commander devices with identification tags.

With respect to the control of the operation, several methods are possible:

Dedicated commands can direct the operation to the desired network device. Command dedication could be realized by:
Prefixed remote commander button allocations. Remote commander button allocations can be achieved via remote commander learning function, for example. The user can assign a button to a specific network device.
Remote commander button combinations
Face recognition can be used to offer the user independent from his position within the home a selection of operations that correspond to his prior viewing/listening etc. For example, if the user caused a playback in one room, the system will offer him to continue the playback in another room taking the data from the operation history database in combination with a face recognition.
Remote commander with specific ID can be used to determine operations independent from the location in the home. The user takes the remote commander to another room and the network device that receives the remote command can identify the last operations that were executed with this remote commander via the ID and thus offers the user specific options related to the latest operations.
Remote commander with integrated display can offer a graphical representation of the network devices and the option to select these devices directly. To sum up, the device database and the operation history database offers a bunch of further options to control the network devices of a home entertainment network 10.

With respect to FIG. 1, a particular streaming scenario has been described. However other scenarios are of course also possible using more than two network devices for streaming. Assuming a streaming from set-top box 141 of sub-network 14 to TV set 120 of sub-network 12, set-top box 141 streams to proxy 140 (TV set 140) via HEC, proxy 140 streams to proxy 122 (Blu-ray disc player 122) via Ethernet and proxy 122 streams to TV set 120 via HEC.

The example described above refers to the playback of a Blu-ray disc only. However also if the user is watching a TV program e.g. via a set-top box or an internal tuner of a TV set, this operation is also registered in the operation history database. In this case in the column "operation" the TV program information is stored, for example by program number (e.g. 15) and program ID (e.g. BBC1) or frequency or channel number.

Figure 4:
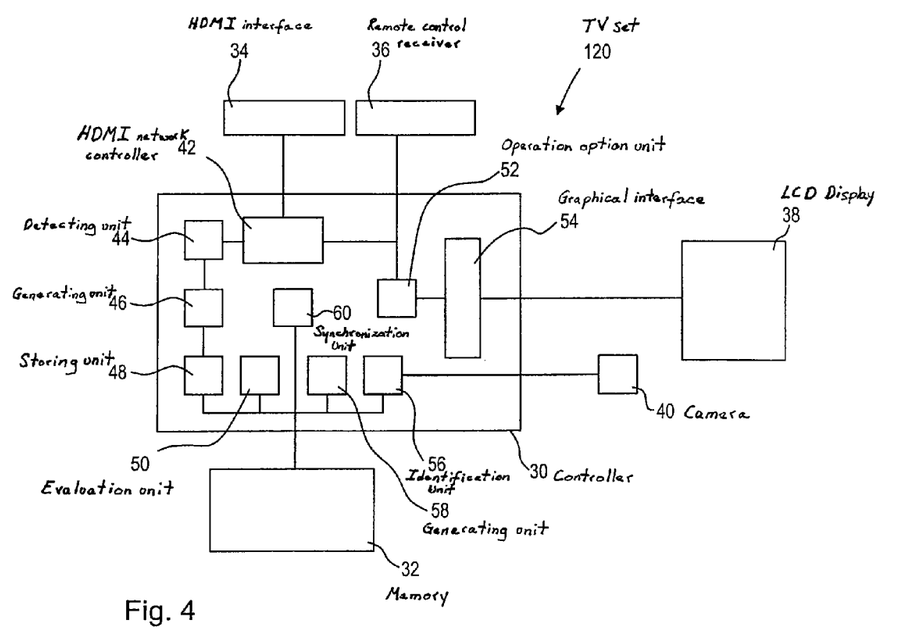
FIG. 4 shows a block diagram of a network device.

With respect to FIG. 4, a portion of a network device, here the TV set 120 of the sub-network 12, is shown in form of a block diagram. The TV set 120 comprises a controller which is indicated with reference numeral 30. A memory or storage element is coupled with the controller and is indicated with reference numeral 32. As to establish communications with other network devices, a HDMI interface 34 is provided and also coupled with the controller 30.

In order to receive commands from a remote commander, a remote control receiver 36 is provided.

Finally, the TV set 120 comprises for example an LCD display 38 and a camera unit 40 which is for example used for face recognition.

The controller 13 comprises a HDMI network controller 42 which is coupled with the HDMI interface 34 and which implements all the functions specified in the HDMI specification (for example version 1.4).

The controller 30 further comprises a detecting unit 44 which detects all the user commands input via the remote commander or directly via any hardware buttons. The command event detected by the detecting unit 44 is supplied to a generating unit 46 which is adapted to generate a data record for the operation history data base mentioned above. This data record generated by the generating unit is supplied to the storing unit 48 which serves to store this data record in the respective operation history database stored in the memory 32.

The information stored in the operation history database as well as in the device database is evaluated by an evaluation unit 50 which supplies the result to an operation option unit 52. This unit 52 is adapted to provide the user with the selectable command options presented on the LCD display 38 by means of the graphical interface 54.

As already mentioned before, the camera 40 is used for face recognition processes which are processed by a user identification unit 56.

The device database is built up and maintained by a device database generating unit 58 and is synchronized with other device databases via a synchronization unit 60. As well, this synchronization unit 60 synchronizes the operation history database with other network devices.

It is to be noted that this is an exemplified structure of a part of a network device, only. The units may be provided in hardware or software.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A network device for a communication network comprising:
   circuitry to:
      provide Ethernet network communication capability and consumer electronics control (CEC) communication capability;
      generate a device database including information about which of a plurality of network devices, including the network device, are members of a home entertainment network and an operation history database containing information about network device operations tasked by a user of one of the plurality of network devices, each of the plurality of network devices being connected to the communication network,
   wherein at least one of the device database and the operation history database includes first information indicating an operation of a specified network device of the plurality of network devices, second information indicating a network address of said specified network device, and third information indicating a time and date of the operation, and
   the network address comprises an address according to the HDMI specification and a sub-network identifier identifying a sub-network within the network to which the at least one of the plurality of network devices belongs.

2. The network device of claim 1, wherein the circuitry is further to:
   detect each of the network device operations tasked by the user;
   generate a data record for each of the network device operations, based on the detecting; and
   store the data records in the operation history database.

3. The network device of claim 2, wherein one of the data records comprises a network address associated with a corresponding one of the network device operations, an indication of the corresponding network device operation, and a date/time combination associated with the detecting.

4. The network device of claim 3, wherein the network address is associated with at least one of the plurality of network devices which is involved in the corresponding network device operation.

5. The network device of claim 2, wherein one of the data records comprises information about the user which tasked a corresponding one of the network device operations.

6. The network device of claim 5, wherein the circuitry is further to:
   identify the user.

7. The network device of claim 6, wherein the circuitry is further to identify the user based on facial recognition, and
   at least a portion of the circuitry is included in a camera.

8. The network device of claim 1, wherein the circuitry is further to:

evaluate at least one of the operation history database and the device database; and provide operation options in response to the evaluation.

9. The network device of claim 1, wherein at least one of the device database and the operation history database further comprising fourth information indicating a network address of another network device of the plurality of network devices involved in the operation.

10. The network device of claim 1, wherein the circuitry is further to synchronize at least one of the operation history database and the device database with databases corresponding to each other one of the plurality of network devices.

11. The network device of claim 10, wherein the circuitry is further to synchronize using at least one of the Ethernet network communication capability and the CEC communication capability.

12. The network device of claim 1, wherein the device database comprises a data record for each other one of the plurality of network devices.

13. The network device of claim 12, wherein each of the data records comprises an HDMI address, a sub-network identifier, and date/time information for a login associated with a corresponding one of the plurality of network devices.

14. The network device of claim 1, wherein the network device is one of a TV set, a Blu-ray disc playback device, a digital video disc (DVD) device, an audio visual (AV) receiver, a video recorder device, an MP3 player device, a personal computer device, a mobile device, a personal digital assistant, and a smart phone device.

15. The network device of claim 1, wherein the circuitry is further to send a unique identifier identifying a remote control within the network.

16. The network device of claim 15, wherein the unique identifier corresponds to information about the user.

17. The home entertainment network comprising the plurality of network devices, at least two of the plurality of network devices being defined in accordance with the network device of claim 1.

18. The network of claim 17, wherein at least one of the at least two network devices is member of a first sub-network of the communication network and at least a second of the network devices is member of a second sub-network of the communication network, wherein the sub-networks are communicatively coupled by a switch device.

19. The network of claim 18, wherein at least one network device of each of the first sub-network and the second sub-network is coupled with the switch device using either an Ethernet connection or HEC-compliant connection.

20. A method for controlling and re-routing audio, video and data streams in a network, comprising:

providing an Ethernet network communication capability and consumer electronics control (CEC) communication capability in the network; and generating, by processing circuitry of a network device, a device database containing information about which of a plurality of network devices, including the network device, are members of the network and an operation history database containing information data records about network device operations tasked by a user of one of the plurality of network devices, each of the plurality of network devices being connected to the network, wherein at least one of the device database and the operation history database includes first information indicating an operation of a specified network device of the plurality of network devices, second information indicating a network address of said specified network device, and third information indicating a time and date of the operation and fourth information indicating a network address of another network device of the plurality of network devices involved in the operation, the network comprises at least two HDMI sub-networks and the network address is built-up by an address according to the HDMI specification and a sub-network identifier identifying which of the at least two HDMI sub-networks a network device associated with the corresponding one of the network device operations belongs to.

21. The method of claim 20, further comprising:

detecting each of the network device operations tasked by the user;

generating a data record for each of the network device operations, based on the detecting; and storing the data records in the operation history database.

22. The method of claim 21, wherein one of the data records comprises a network address associated with a corresponding one of the network device operations, an indication of the corresponding network device operation, and a date/time combination associated with the detecting.

23. The method of claim 22, wherein the network address is associated with at least one of the plurality of network devices which is involved in the corresponding network device operation.

24. The method of claim 21, further comprising:

adding information identifying the user which tasked a corresponding one of the network device operations to one of the data records.

25. The method of claim 20, further comprising:

evaluating at least one of the operation history database and the device database; and providing operation options in response to the evaluating.

26. The method of claim 25, further comprising:

scanning the user tasking one of the network device operations; and obtaining a unique identifier for the user.

27. The method of claim 26, wherein said unique identifier is obtained by scanning a face of the user by a camera and applying a facial recognition process to an image obtained by the camera.

28. The method of claim 20, further comprising synchronizing at last one of the operation history database and the device database of the network device with respective databases of each other one of the plurality of network devices in the network.

29. The method of claim 20, further comprising:

re-routing at least one of the audio, video, and data stream from the network device to another one of the plurality of network devices based on data stored in at least one of the operation history database and the device database.

30. The method of claim 20, further comprising:

presenting the user with a list of the plurality of network devices for selection as a source or sink network device for streaming, the list being generated based on at least one of the operation history database and the device database.

31. The method of claim 20, further comprising:

generating the device database, which includes a data record for each of the plurality of network devices that are members of the network.

32. The method of claim 31, wherein said generating comprises sending a message to each network address within the network, waiting for an acknowledgement message, and generating a data record when the acknowledgement message is received.

* * * * *